(12) United States Patent
Konishi et al.

(10) Patent No.: US 7,557,052 B2
(45) Date of Patent: *Jul. 7, 2009

(54) HOSE FOR INTRODUCTION AND DISTRIBUTION OF INFLATOR GAS

(75) Inventors: Tatsuo Konishi, Osaka (JP); Tamotsu Fujii, Tokyo (JP)

(73) Assignees: Toyo Boseki Kabushiki Kaisha, Osaka (JP); Autoliv Development AB, Vargarda (SE)

( * ) Notice: Subject to any disclaimer, the term of this patent is extended or adjusted under 35 U.S.C. 154(b) by 0 days.

This patent is subject to a terminal disclaimer.

(21) Appl. No.: 10/745,922

(22) Filed: Dec. 29, 2003

(65) Prior Publication Data

US 2004/0147186 A1  Jul. 29, 2004

(30) Foreign Application Priority Data

| Dec. 26, 2002 | (JP) | ............... P2002-378089 |
| Apr. 8, 2003 | (JP) | ............... P2003-104457 |
| Sep. 12, 2003 | (JP) | ............... P2003-322274 |
| Oct. 6, 2003 | (JP) | ............... P2003-347509 |

(51) Int. Cl.
| B32B 27/00 | (2006.01) |
| B32B 27/12 | (2006.01) |
| F16L 11/00 | (2006.01) |
| F16L 11/02 | (2006.01) |
| B60R 21/16 | (2006.01) |
| B60R 21/26 | (2006.01) |

(52) U.S. Cl. .............. 442/148; 442/59; 138/123; 138/125; 138/126; 138/145; 280/730.1; 280/730.2; 280/736

(58) Field of Classification Search ............... 442/59, 442/49, 64, 65, 71, 76, 86, 87, 148, 149, 442/99; 138/126, 125, 145; 280/730.2, 736; 239/145, 601

See application file for complete search history.

(56) References Cited

U.S. PATENT DOCUMENTS

| 4,429,580 A | 2/1984 | Testa et al. |
| 5,474,836 A * | 12/1995 | Nishimura et al. ........ 442/301 |
| 5,704,639 A | 1/1998 | Cundill et al. |
| 5,863,068 A | 1/1999 | Breed |
| 5,989,660 A * | 11/1999 | Moriwaki et al. ........ 428/35.2 |

(Continued)

FOREIGN PATENT DOCUMENTS

EP  0 682 136  10/1994

(Continued)

OTHER PUBLICATIONS www.matweb.com, Jul. 20, 2005, density of Nylon 66.*

(Continued)

*Primary Examiner*—D. Lawrence Tarazano
*Assistant Examiner*—Matthew D Matzek
(74) *Attorney, Agent, or Firm*—Morrison & Foerster LLP (57) ABSTRACT

A woven fabric-made hose having at least one distribution hole for introduction and distribution of inflator gas on actuation of an air bag, which hose is installed in a side air bag module, wherein at least one of the outer surface and inner surface of said hose is coated with a rubber or a synthetic resin, and the maximum drawing resistance of fiber is at least 70 N/3 cm in a warp direction and a weft direction.

15 Claims, 2 Drawing Sheets

U.S. PATENT DOCUMENTS

| | | | |
|---|---|---|---|
| 6,135,161 A * | 10/2000 | Nakano et al. | 139/55.1 |
| 6,237,941 B1 * | 5/2001 | Bailey et al. | 280/730.2 |
| 6,328,334 B1 * | 12/2001 | Kanuma | 280/730.2 |
| 6,508,276 B2 * | 1/2003 | Rädlinger et al. | 138/125 |
| 6,832,633 B2 * | 12/2004 | Kitamura et al. | 139/384 R |
| 6,863,089 B2 * | 3/2005 | Kitamura et al. | 138/126 |
| 2002/0020992 A1 * | 2/2002 | Kanuma | 280/730.2 |
| 2002/0106957 A1 | 8/2002 | Ritter | |
| 2002/0155774 A1 * | 10/2002 | Kitamura et al. | 442/208 |
| 2002/0195804 A1 | 12/2002 | Hess et al. | |
| 2005/0006888 A1 * | 1/2005 | Yamanaka | 280/743.1 |

FOREIGN PATENT DOCUMENTS

| | | |
|---|---|---|
| EP | 1 033 292 | 11/1998 |
| EP | 1 365 059 | 10/2001 |
| FR | 2 750 940 | 7/1997 |
| JP | 02-175352 | 7/1990 |
| JP | 06-262994 | 9/1994 |
| JP | 10 100840 | 4/1998 |
| JP | 2001-270415 | 10/2001 |
| WO | WO 98/12075 | 9/1997 |

OTHER PUBLICATIONS

European Search Report dated Jul. 21, 2004, issued in counterpart EP 03 02 9633.9.

Partial European Search Report mailed May 3, 2004, issued in counterpart EP 03 02 9633.

* cited by examiner

HOSE FOR INTRODUCTION AND DISTRIBUTION OF INFLATOR GAS

FIELD OF THE INVENTION

The present invention relates to a hose for introduction and distribution of inflator gas particularly useful for an air bag module against side collision ("side air bag" or "side curtain air bag"), which protects a driver or a passenger in a car upon crash from the side of the car.

PROIR ART

A driver's seat and a passenger's seat are installed with air bag modules, which deploy air bag cushions to constrain the driver or passenger upon head-on collision of the car. The air bag module comprises an inflator which is a device for generating gas, an air bag cushion which deploys with the gas generated by the inflator, a hose for introducing and distributing gas from the inflator to the air bag cushion, and an air bag case containing the inflator and the air bag.

Recently, it is increasingly required to install side air bag modules to decrease the impact, in particular, to protect the head of a driver or a passenger from side collision in addition to the head-on collision. The elements of such a side air bag are folded and installed in center pillars or front pillars. In case of side collision, the gas from the inflator is introduced in the air bag so that the air bag is deployed in the form of a curtain between the passenger and a door to absorb the impact from the side against the passenger.

In addition, the side air bag should be instantly deployed on collision, and the deployment time of the side air bag should be shorter than that required to deploy the air bags for the driver's and passenger's seats. Therefore, an inflator which generates the gas with a relatively high-pressure is often used. In particular, the gas pressure tends to become very high around gas-inlet holes of a hose near the inflator for introducing the gas into the air bag so that the parts of the hose around the gas-inlet holes near the inflator are deformed by the pressure of the gas from the inflator and thus the form of the air bag becomes less uniform during the deployment of the air bag, or fibers near the gas-inlet holes are broken and scattered inside the air bag, which leads to the damage or burst of the air bag resulting in the loss of the function as the air bag.

To remove such drawbacks caused by the partial increase of the pressure, it is proposed to increase the strength of the air bag and the hose for distributing the inflator gas by the use of thick fiber or high-tenacity fiber such as aramid fiber. When the thick fiber is used, the air bag becomes bulky and thus the interior design of the car is restricted because a space for containing the air bag should be reserved. Since the high-tenacity fiber is expensive, the use of such a fiber increases the production cost of the air bag.

Since the side air bags are folded and installed in center pillars or front pillars, those which can be installed in a compact form are desired so that they have less influence on the design of the car interior.

Hitherto, by taking into account the distribution of the inflator gas, JP-A-10-100840 discloses an air bag module comprising a difuser having a plurality of holes for quickly distributing and introducing gas generated by an inflator into the air bag, and JP-A-2001-270415 discloses an air bag module in which the shape of a gas-injecting opening of a difuser is optimally designed to control the deploying shape of the air bag until the completion of deployment of the air bag.

However, these air bag modules proposed by the prior art only control the gas flow from the inflator, but properties, which are required when the high pressure gas flows in a hose for distributing and introducing the inflator gas into the air bag, are not considered. In particular, when the air bag is deployed, the high pressure gas instantaneously flows through the hose. Therefore, the hose bounces due to the counteraction of the gas flow so that the positions or directions of the distribution holes of the hose depart from the original positions or directions, and thus each section of the air bag, into which the gas should be efficiently injected, cannot be well deployed, or the high pressure gas is concentrated in the certain sections of the air bag, which results in the burst of the air bag.

Furthermore, the above prior patent applications pay no attention to the workability of the hose, when the hose is received in the air bag and then mounted in the center pillar or the front pillar in the folded form. Usually, after the hose is received in the air bag and before the air bag module is installed in the car, the air bag is folded or rolled in a small size and assembled in the form of an air bag module which can be mounted in the car. If the hose is too rigid, it is difficult to fold the hose and also the hose tends to return to the original form after being folded. Thereby, the shapes of other elements of the air bag module are deformed. As a result, it becomes difficult to mount the air bag module in the center pillar or the front pillar as originally designed.

SUMMARY OF THE INVENTION

One object of the present invention is to provide a highly reliable hose for introduction and distribution of inflator gas in a side air bag, which can suppress the damage of a part of the hose around a hole for distributing the inflator gas when an air bag is deployed.

Another object of the present invention is to provide a hose for introduction and distribution of inflator gas in a side air bag, which can prevent the fluctuation of the hose caused by the flow of high pressure gas when an air bag is deployed, and thus have high deployment reliability.

A further object of the present invention is to provide a hose for introduction and distribution of inflator gas, which can improve the workability of a side air bag when the side air bag is mounted in a car and which is not damaged or does not damage the air bag when the high pressure gas flows through the hose.

According to the first aspect, the present invention provides a woven fabric-made hose having at least one distribution hole for introduction and distribution of inflator gas on actuation of an air bag, which hose is installed in a side air bag module, wherein at least one of the outer surface and inner surface of said hose is coated with a rubber or a synthetic resin, and the maximum drawing resistance of fiber is at least 70 N (Newton)/3 cm in a warp direction and a weft direction, when the drawing resistance is measured by a pin-hitching method defined in JIS L1096, 8.21.3 with a sample having a width of 3 cm and a length of 5 cm which is cut out from the hose such that the periphery of the hole constitutes one side of the sample and the width direction of the sample is perpendicular to each of the warp and weft directions of the fabric of the hose (hereinafter referred to as "the first invention").

In the first invention, the maximum drawing resistance is preferably at least 100 N/3 cm in the warp direction and the weft direction. Furthermore, a coating amount of the rubber or synthetic resin is preferably from 10 to 80% by weight based on the weight of the hose before coating.

When a reinforced part is formed at the inner periphery of the hole of the hose, the damage of the periphery of the hole caused by the high pressure of the gas can be effectively suppressed. The reinforced part may be formed by applying an adhesive to the inner periphery of the hole, or by forming the hole by cutting the fabric with a laser beam. The latter method is preferable since the production process of the hose can be simplified.

In one preferred embodiment of the first invention, the reinforced part of the hole periphery is formed by contacting a heating device directly to the inner periphery of the hole.

According to the second aspect, the present invention provides a woven fabric-made hose for introduction and distribution of inflator gas on actuation of an air bag, which hose is installed in a side air bag cushion, wherein at least one of the outer surface and inner surface of said hose is coated with a rubber or a synthetic resin, and the fabric has a bending resistance of at least 100 mm in a direction in parallel with the lengthwise direction of the hose (hereinafter referred to as "the second invention").

In the second invention, the lengthwise direction of the hose is preferably in accord with either the warp direction or the weft direction of the fabric.

Preferably, an original yarn in the lengthwise direction of the hose has a single filament of at least 2 dtex when the fabric is unwoven. Furthermore, one sheet of the fabric constituting the hose preferably has a cover factor (CF), which is defined by the following formula, of at least 2,000 in the lengthwise direction of the hose:

$CF = $[total fineness (dtex) of a yarn in lengthwise direction of a hose]$^{1/2}$×[weave density in lengthwise direction of a hose (threads/2.54 cm)]

In addition, a coating amount of the rubber or synthetic resin is preferably from 10 to 80% by weight based on the weight of the hose before coating also in the second invention.

According to the third aspect, the present invention provides a woven fabric-made hose having at least one distribution hole for introduction and distribution of inflator gas on actuation of an air bag, which hose is installed in a side air bag cushion, wherein said hole is formed by perforating the fabric of the hose, and a total area $S_1$ of discrete yarn parts each surrounded by the following (1) and (2) is 30% or less of the area $S_0$ of the hole when the hose area having said hole is flattened:

(1) Edges of the hole perforated (2) Discrete yarn having the longest length among discrete yarns remaining on the hose, the both ends of which are cut when the hole is perforated and which intersect the edge of the hole (hereinafter referred to as "the third invention").

When a hole is perforated in the wall of a hose made of a woven fabric, discrete yarns sometimes appear on the inner periphery of the hole. In the part occupied by the discrete yarns, warp yarns and/or weft yarns are cut off from the yarns constituting parts other than the discrete yarn part. Therefore, the discrete yarn part has a very low constraint force so that the discrete yarns easily scatter when the high pressure gas flows through the hole and thus the hole is expanded and deformed. When the total area $S_1$ of the discrete yarn parts is large, the hole is largely expanded and deformed so that the deployment of the air bag becomes irregular, or the high pressure gas is concentrated in a specific portion of the air bag which may lead to the breakage of the air bag. When the total area $S_1$ of the discrete yarn parts is 30% or less, the degree of expansion or deformation of the hole is very small or none. Therefore, the deployment reliability of the air bag is increased.

In the third invention, a weft skew of the hose is preferably 20% or less in the widthwise direction of the hose when measured according to JIS L1096, 8.11.

The cover factor CF of the fabric is preferably at least 2,000 in the lengthwise direction of the hose also in the third invention.

In the third invention, the total area $S_1$ of discrete yarn parts is limited to 30% or less of the area $S_0$ of the hole, the hose can suppress the expansion or deformation of the hole and thus increase the deployment reliability of the air bag. Furthermore, since the hose is made of a woven fabric, its receivability (packageability or compactness) is good, and its production cost is low.

According to the fourth aspect, the present invention provides a woven fabric-made hose for introduction and distribution of inflator gas on actuation of an air bag, which hose is installed in a side air bag cushion, wherein at least one of the outer surface and inner surface of said hose is coated with a rubber or a synthetic resin, one sheet of woven fabric constituting the hose has a thickness t of 0.9 to 3 mm, and a loop hardness Lh (unit: N) and the thickness t (unit: mm) of the single fabric have the following relationship:

$Lh/t \leq 5$ (N/mm)

when measured according to a loop-compression method defined in JIS L1096, 8.20.3 with a rectangular sample having a length of 5 cm and a width of 2 cm which is cut out from the hose such that the shorter side of the sample is in parallel with the lengthwise direction of the hose (hereinafter referred to as "fourth invention").

The above formula defines the relationship of the loop hardness Lh of the hose in the width direction of the hose and the thickness of the hose wall. When the hose satisfies the above relationship of Lh and t, it has sufficient strength to withstand the flow of high pressure gas generated by the inflator of the air bag module and also suitable flexibility. Therefore, an air bag receiving such a hose can be easily folded.

In the fourth invention, a loop repulsion rate Lr is preferably 60% or less when measured according to the loop compression method of JIS L1096, 8.20.3.

The rubber to be coated is preferably a silicone rubber. In view of the improvement of folding workability of the air bag, the main weaving structure of the woven fabric is preferably twill weave or satin weave.

DETAILED DESCRIPTION OF THE INVENTION

In general, a side air bag module comprises an inflator which generates gas, an air bag which is deployed with the inflator gas, and a hose for introducing and distributing the inflator gas in the air bag.

Since the hose for introducing and distributing inflator gas according to the present invention is installed in a passenger vehicle, it is preferably made of a woven fabric from the viewpoint of lightweight and receivability. The kind of a yarn for weaving a fabric is not limited. Preferable examples of the yarn include yarns of polyamide fiber (e.g. polyamide 6 fiber, polyamide 66 fiber, polyamide 46 fiber, etc.), polyester fiber (e.g. polyethylene terephthalate fiber, polymethylene terephthalate fiber, polybutylene terephthalate fiber, polylactic acid fiber, etc.), and the like. The tenacity of a yarn comprising such fiber is preferably at least 5 cN/dtex, more preferably at least 6 cN/dtex, most preferably at least 7 cN/dtex, in terms of a tenacity of unwoven yarn. When the yarn has such a tenacity, the warp or weft yarns of the hose are not broken and the false distribution of the gas may not happen, when the high pressure gas, which has a pressure at a level sufficient for maintaining an inner pressure of the air bag, is flowed through the hose. Herein, the "tenacity of unwoven yarn" means a tenacity of a yarn which is obtained by unweaving the warp and weft yarn of a fabric constituting the hose and removing the rubber or the resin adhered to the yarn.

The total fineness of the yarn constituting the hose is preferably from 110 to 7,000 dtex. The yarn may be a twisted yarn or a finished yarn, and it may be a multifilament or a monofilament. More preferably, a yarn in the lengthwise direction of the hose has a total fineness of 500 to 3,000 dtex, and a yarn in the widthwise direction of the hose has a total fineness of 500 to 5,000 dtex. When the fineness of the yarn in the lengthwise direction of the hose is less than the above lower limit, the hose may have insufficient strength in the lengthwise direction. In addition, a larger amount of yarns are required to increase the weave density of the fabric and thus the weaving productivity decreases unpreferably from the viewpoint of costs, when the yarns in the lengthwise direction of the hose are either the warp yarns or the weft yarns of the woven fabric. When the fineness of the yarn in the widthwise direction of the hose is less than the above lower limit, again a larger amount of yarns are required to increase the weave density of the fabric and thus the weaving productivity decreases unpreferably from the viewpoint of costs.

When the total fineness of the yarn exceeds the above upper limit, the hose becomes bulky so that the compactness of the hose deteriorates.

The single filament fineness of a yarn constituting the hose is preferably 10 dtex or less. In particular, when an easily foldable flexible hose is produced, yarns in the width direction of the hose preferably have a single filament fineness of 5 dtex or less, more preferably 4 dtex or less, most preferably 3 dtex or less.

The total fineness and single filament fineness used herein mean the fineness of the yarn obtained by unweaving the warp and weft yarn of a fabric constituting the hose and removing the rubber or the resin adhered to the yarn.

As a loom to weave the fabric of the hose according to the present invention, a circular loom which is conventionally used to weave a fire hose and can weave a hose-form fabric in a single process, a shuttle loom, a needle loom which is used to weave a seat belt and the like may be used. When the circular loom, shuttle loom or needle loom is used, the lengthwise direction of the hose is preferably in parallel with the warp direction of the woven fabric. Alternatively, a wide fabric is woven with a general loom such as a water jet loom or a rapier loom, and cut and shaped in a hose form by sewing, adhering or welding. However, the former looms which can weave the tubular product in a single process are preferable, since they can reduce the processing cost for sewing, etc. and avoid the burst of the sewn part, which is usually weaker than weaving parts.

Depending on the kind of the loom used, the hose width may be fluctuated by waving of the warp, or weft skew may occur in the weft direction of the fabric. Preferably such waving or weft skew are suppressed as much as possible. From such a viewpoint, it is preferable to select the kind of the loom. For example, the needle loom can more easily decrease the fluctuation of the supplying tension of the weft than the shuttle loom, and thus the former can suppress the waving of the warp which is caused by the unstability of the supplying tension of the weft, so that the width of the hose is less fluctuated, and the formation of discrete yarns can be suppressed.

In the second invention, the bending resistance of the hose in the lengthwise direction is at least 100 mm. Thus, it is preferable to produce the hose with the direction of the fabric having the maximum bending resistance in parallel with the lengthwise direction of the hose. When the fabric has substantially the same bending resistance in all directions, any direction of the fabric may be in parallel with the lengthwise direction of the hose.

Examples of the weaving structure of the fabric to be used in the production of the hose according to the present invention include plain weave, twill weave, satin weave, multi-ply weave, etc. Among them, plain weave, twill weave and satin weave are preferable when the cost and strength of the fabric and the flexibility of the fabric contributing to the improvement of receivability are taken into account.

In the fourth invention, to produce the hose which satisfies the relationship of the loop hardness Lh and the thickness t of the hose wall and also a loop repulsion rate Lr, which will be explained below, it is possible to form the parts of the hose which are folded together with the air bag cushion, and other parts using different weave structures which are suitable for respective parts.

That is, from the viewpoint of the receivability (i.e. easy folding) of the air bag, the parts of the hose to be folded preferably have a weaving structure having less intersects of warps and wefts and flexible texture such as twill weave and satin weave. The peripheral part of the hole is most likely subjected to the force when the inflator gas passes through the hole and thus the yarns tend to be frayed. To prevent the fray of the yarns, the peripheral part of the hole preferably has a weaving structure such that warps and wefts intersect and constrain each other to prevent the drawing of yarns, for example, plain weave. In this case, the width of the part of the fabric having the plain weave is preferably at least 3 mm, more preferably at least 5 mm from the edge of the hole. The area of the part having the plain structure does not interfere with the receivability (easy folding) of the hose, for example, it is 20 mm or less from the edge of the hole, and the main weaving structure of the hose is preferably twill weave or satin weave. In such a case, the area ratio of the parts having the twill or stain weave to other parts is preferably from 1:1 to 5:1, more preferably from 2:1 to 4:1.

When a reinforced part is formed at the inner periphery of the hole of the hose, the fray of the yarn can be prevented. In this case, the plain weave part may not be formed.

To prevent the breakage of the hose caused by the pressure applied when the inflator gas flows through the hose, one sheet of a fabric constituting the hose preferably has a corrected weight of at least 800 g/m$^2$, more preferably at least 1,000 g/m$^2$, most preferably at least 1,200 g/m$^2$. Herein, the "corrected weight" means a weight of 1 m$^2$ of the hose, which is coated with the rubber or the resin and then opened by cutting the hose in parallel with the lengthwise direction (warp direction) of the hose. When the hose has an interwoven selvage (seamed part), the corrected weight is measured with the fabric sample of 1 m² excluding the selvage.

To suppress the formation of discrete yarns at the periphery of the hole, it is effective to prevent the generation of weft skew in the width direction of the hose. The degree of weft skew can be measured according to JIS L1096, 8.11. When the hose is produced with the circular loom, etc., the length of a line, which is drawn from one edge of the hose, that is flattened, to the other edge in the width direction so that the line is perpendicular to the lengthwise direction of the hose, is used as length "a" (mm) in the method of JIS L1096, 8.11. The weft skew in the widthwise direction of the hose is preferably 20% or less, more preferably 10% or less. When the weft skew is 20% or less, the waving of the yarns constituting the hose is prevented. Thus, the discrete yarns are hardly generated when the hole is perforated, and the defects at the periphery of the hole are less formed.

Figure 4A:
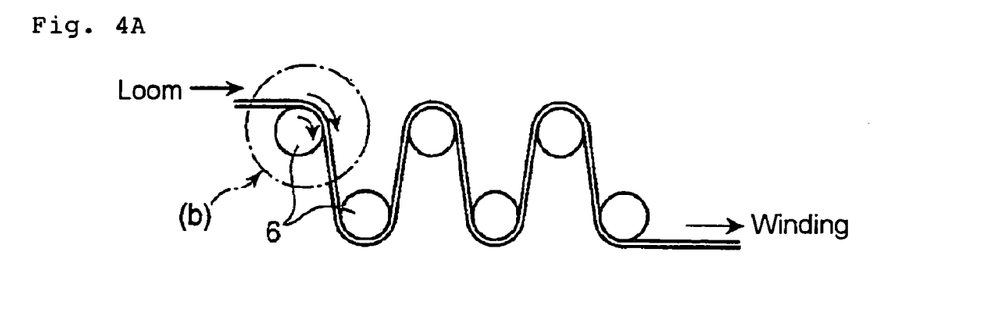
FIGS. 4A and 4B schematically show a bending state of ho a hose during the winding process.
Figure 4B:
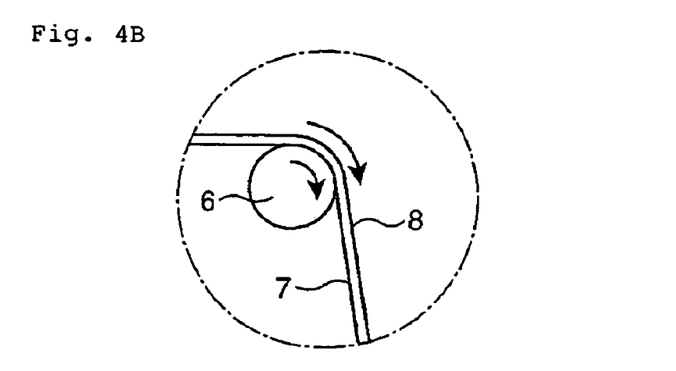

To suppress the formation of weft skew in the widthwise direction of the hose, it is preferable to prevent the bending of the fabric in the step from the weaving of the fabric to the winding of the fabric from the loom. The fabric woven by the loom is wound via plural rolls. In this step, as shown in FIG. 4A, when the rolls are provided such that the hose is bent at the rolls, tensions applied to roll-contacting side 7 and non-contacting side 8 are different on roll 6 (see FIG. 4B). Thus, the yarns on non-contacting side 8, to which a larger tension is applied, is pulled with a larger force than the yarns on roll-contacting side 7. Therefore, the fabric easily suffers from weft skew. To prevent the weft skew due to the bending of the hose, it is preferable to apply some measure, for example, to control the tensions applied to the roll-contacting side and the non-contacting side becoming even. As such a measure, free rolls are used as some of the plural rolls, or rolls are arranged so that a degree of bending of the hose is reduced.

Furthermore, the weft skew can be suppressed by controlling the cover factor CF of the hose, which is defined above, in the lengthwise and widthwise directions. For example, the cover factor of the hose in the lengthwise direction is usually at least 1,500, preferably at least 2,000, more preferably at least 2,200, most preferably at least 2,400, and the cover factor of the hose in the widthwise direction is usually at least 500, preferably at least 600, more preferably at least 700. When the cover factor in the lengthwise direction is less than the above lower limit, it is difficult to prevent the permeation of the rubber or resin as a coating agent. In addition, the yarns in the lengthwise direction tend to easily move in the widthwise direction so that the weft skew of the hose easily occurs and the discrete yarn parts tends to form. When the cover factor in the widthwise direction is less than the above lower limit, the coating agent permeates the fabric, or the constriction force between the yarns may not be generated so that the yarns tend to shift when the hose passes over the rolls of the loom. The yarn-shifting unpreferably causes the weft skew of the hose. When the cover factor in the lengthwise or widthwise direction is too large, the hose becomes bulky. Preferably, the cover factor in the lengthwise direction does not exceed 5,000, more preferably 4,000, and the cover factor in the widthwise direction does not exceed 900, more preferably 800.

The cover factor used herein means a value calculated with one sheet of the fabric constituting the hose.

To control the bending resistance in the lengthwise direction of the hose in the range defined in the second invention, it is effective to adjust a cover factor in a suitable range, besides the control of the single filament fineness of the warp in the range of at least 2 dtex. That is, the cover factor is preferably at least 2,000 in the lengthwise direction of the hose.

When the cover factor in the lengthwise direction of the hose is less than 2,000, it may sometimes be difficult to increase the stiffness of the hose in its lengthwise direction, even if the warp yarn has the single filament fineness in the above range. The cover factor in the lengthwise direction of the hose is preferably at least 2,200, more preferably at least 2,400. A cover factor of the hose in the direction perpendicular to the lengthwise direction is not limited. To prevent the permeation of the coating agent, the cover factor in this direction is preferably at least 500, more preferably at least 600. Since the hose having the cover factors in the above ranges has a certain weight, it can suppress fluttering by its own weight. When plural sheets of woven fabrics are laminated or piled up to produce a hose, the sum of the cover factors of the woven fabrics in the lengthwise direction of the hose is used as the cover factor of the hose in the lengthwise direction.

The hose of the present invention preferably has an inner diameter of 2 cm to 6 cm. When the inner diameter is less than 2 cm, a pressure loss in the hose increases so that the hose may be partly broken. When the inner diameter exceeds 6 cm, it is difficult for the hose to be inserted in the air bag cushion. The inner diameter of the hose is preferably from 3 cm to 5 cm.

The hose of the first invention for introducing and distributing the inflator gas has at least one hole for distributing the gas into the air bag. The important characteristic of the hose of the first invention is that the maximum drawing resistance of fiber is increased to 70 N/3 cm or more in the warp direction and the weft direction.

Herein, the maximum drawing resistance means the maximum value obtained in the fabric testing method defined in JIS L1096, 8.21.3. Concretely, a warp or weft direction sample with a width of 3 cm and a length of 5 cm is cut out from a fabric constituting a hose with the widthwise direction (3 cm) of the sample being perpendicular to the weft or warp direction of the fabric and the periphery of the hole constituting one side of the sample. Then, pins are inserted along a line apart from the edge including the periphery of the hole of the sample by 3 mm, and the sample is attached to a fabric testing machine with a distance of 5 mm between one head and the pin position and pulled at a pulling rage of 15 cm/min. to measure the maximum force as the maximum drawing resistance.

When the side line of the hole is not perpendicular to the warp or weft direction of the fabric, or the hole has a shape other than a rectangular, for example, a circle, a sample can be cut out from the fabric such that the periphery of the hole constitutes one side of the sample, and the warp or weft direction of the sample is perpendicular to the warp or weft direction of the fabric with the most protruded part of the hole is used as the base.

When the length of one side of the hole is smaller than 3 cm, a sample is cut out according to the actual size of the hole, and the measured maximum drawing force is converted to a value for 3 cm.

If the maximum drawing resistance is less than 70 N/3 cm, a part of the warp and/or weft yarns on the periphery of the hole are frayed and thus the hole is deformed so that the size of the hole becomes larger than the designed size, when the high pressure gas generated by the inflator is passed through the hole in a very short time and introduced in the air bag. If the hole is deformed and enlarged, the amount of the gas supplied through the hole exceeds the designed amount so that the degree of deployment of the air bag is not uniform throughout the air bag. In particular, when the air bag has several expansion compartments, the excessive amount of the gas is introduced in some compartments so that those compartments may burst. Thereby, the impact absorbing effect of the air bag may greatly be deteriorated. Furthermore, when the yarns are frayed and scattered in the air bag, the yarns may be molten to cause the burst of the air bag.

The maximum drawing resistance is preferably at least 100 N/3 cm, more preferably at least 160 N/3 cm.

In the present invention, a coating agent such as a rubber or a synthetic resin is preferably coated on at least one surface of the woven fabric constituting the hose of the present invention to increase the maximum drawing resistance to 70 N/3 cm or more or to stabilize the distribution rate of the gas into the air bag by lowering the gas permeability of the hose fabric to prevent the gas leakage through the fabric. When no coating agent is applied to the fabric, the gas supplied from the inflator leaks from the surface of the hose to outside the hose when the air bag is actuated. Therefore, the gas distribution rate to each expansion compartment of the air bag is not stabilized. If the hose fabric has a part through which the gas easily escapes, the high pressure gas is concentrated at such a part resulting in the burst of the hose.

Examples of the rubber to be used as the coating agent include neoprene rubber, ethylene-propylene-diene (EPDM) rubber, silicone rubber, etc. Among them, the silicone rubber is preferable because of its high heat resistance. Preferable examples of the silicone rubber are thermosetting addition polymerized silicone rubber, two-component type RTV silicone rubber, etc. The silicon rubber may contain a coupling agent such as an aminosilane coupling agent, epoxysilane coupling agent, vinylsilane coupling agent and chlorosilane coupling agent to improve the adhesiveness of the silicone rubber.

Examples of the synthetic resin to be used as the coating agent include polyester resin, polyamide resin, polyester elastomer, polyamide elastomer, polyurethane elastomer, etc.

When the addition polymerized silicone rubber or other thermosetting rubber is used, a curing agent such as a platinum material (e.g. platinum powder, chloroplatinic acid, tetrachloroplatinic acid, etc.) may be used.

The coating agent may preferably contain an adhesive aid to improve the adhesion of the coating agent to the hose fabric. Any adhesive aid may be used in the present invention as long as it can improve the adhesion of the coating agent to the hose fabric. Specific examples of the adhesion aid include an aminosilane coupling agent, epoxysilane coupling agent, vinylsilane coupling agent, chlorosilane coupling agent, mercaptosilane coupling agent, and mixtures thereof.

The coating agent and the optional components may be dissolved or dispersed in a solvent. The solvent may be any conventionally used solvent such as toluene. The concentration of the coating agent is not limited and may be adjusted to a concentration at which the solution or dispersion is easily applied, and selected by taking the degree of the penetration of the solution or dispersion in the hose fabric.

To control the stiffness of the hose so as to improve the receivability of the hose, it is one of the effective means to select a coating agent with good flexibility. One example of the coating agent with good flexibility is a low modulus type silicone rubber which has a small stress when it is expanded to a certain specific length. The low modulus type silicone rubber can prevent the increase of the loop hardness or the loop repulsion rate caused by the coating agent.

The coating agent may be applied to the hose fabric by any method. For example, the hose is directly dipped in the coating agent, the coating agent is brush coated on the surface of the hose, or the film form coating agent is adhered to the surface of the hose.

The amount of the coating agent to be applied depends on the weave density of the hose fabric, the degree of constraint of the yarns constituting the fabric, etc. The amount of the coating agent to be applied may be from 10% to 80% by weight, preferably from 25% to 60% by weight of the hose weight in terms of the dry (cured) weight of the coating agent. When the amount of the coating agent is less than the above lower limit, the gaps between the yarns constituting the woven fabric may not sufficiently be filled with the coating agent. In such a case, a sufficient constraining force between the yarns may not be attained so that the yarns near the hole tend to be frayed and the gas distribution rate may deviate from the designed value. When the amount of the coating agent exceeds the above upper limit, the weight of the hose as a whole increases and the hose becomes bulky. Thus, the receivability of the hose deteriorates, and the production cost of the hose increases.

The amount of the coating agent applied may be measured by measuring the weight of the hose before and after the application of the coating agent and calculating the difference of the weight; by removing the applied coating agent from the hose using a solvent in which only the coating agent is dissolved and then measuring the weight of the hose; or by removing the yarns from the hose coated with the coating agent using a solvent in which only the yarns are dissolved and then measuring the weight of the coating agent remained.

The hose of the second invention is characterized in that at least one of the outer surface and inner surface of the hose is coated with a coating agent, that is, a rubber or a synthetic resin, and the fabric constituting the hose has a bending resistance of at least 100 mm in a direction in parallel with the lengthwise direction of the hose.

Here, the bending resistance means a value obtained by JIS L1096, 8.19.1 (45 degrees cantilever method), and indicates a degree of resistance of a hose folded in a sheet form against bending deformation. When it is difficult to measure bending resistance by the above method, for example, when the bending resistance is sufficiently large so that it cannot be measured with the sample length defined by the above JIS method, an angle of sagging of a hose having a specific length by its own weight is compared with an angle of sagging of a hose having a known bending resistance.

When the bending resistance is less than 100 mm, the hose does not have sufficient stiffness. Thus, when the inflator gas is injected in the hose received in the air bag, the hose bounces due to the counteraction of the flow of the high pressure gas so that the position of the hole shifts and the gas is not supplied to expansion compartments of the air bag as designed and therefore the air bag may not be sufficiently deployed. When the distal end of the hose remote from the inflator is not fixed, the hose largely fluctuates and thus the inflator gas may not be effectively introduced in the expansion compartments of the air bag. When the air bag has several compartments, the inflator gas is concentrated in some compartments resulting in the burst of the air bag. The bending resistance is preferably at least 120 mm, more preferably at least 150 mm.

In the present invention, a bending resistance of the hose in the direction perpendicular to the lengthwise direction of the hose is not limited, since the bouncing of the hose in case of the injection of the high pressure gas can be suppressed as long as the bending resistance in the lengthwise direction of the hose is at least 100 mm, even when the bending resistance of the hose in any direction other than the lengthwise direction of the hose is less than 100 mm. However, the hose of the present invention is inserted in the air bag cushion and thus the hose is folded or wound together with the air bag cushion when the air bag is installed in the car. Therefore, the bending resistance of the hose in the direction perpendicular to the lengthwise direction of the hose is preferably not very large, and is preferably 300 mm or less, more preferably 200 mm or less.

In the second invention, a means to control the bending resistance in the lengthwise direction of the hose in the above range is not limited. For example, a single filament fineness in the lengthwise direction of the hose is adequately selected, a cover factor of the fabric is adequately selected, or the coating agent is applied to the fabric. These means may be combined.

The hose of the third invention is characterized in that the total area $S_1$ of discrete yarn parts surrounding by the above-defined (1) and (2) is 30% or less of the area $S_0$ of the hole when the hose area having the hole is flattened.

Figure 1:
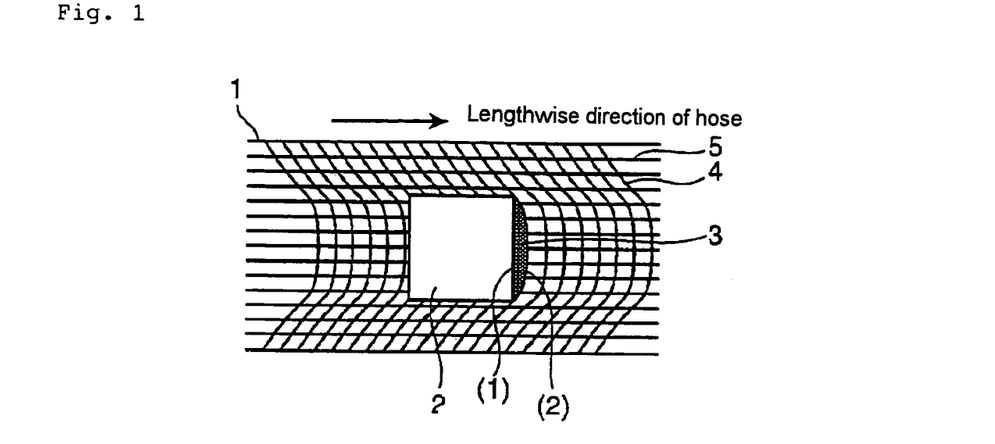
FIG. 1 schematically shows a hole of a hose for introducing and distributing inflator gas and a portion around the hole before the flow of the inflator gas.

FIG. 1 schematically shows hole 2 of hose 1 for introducing and distributing inflator gas and a portion around the hole before the flow of the inflator gas. Hole 2 is formed by perforation. In FIG. 1, numeral 3 indicates a discrete yarn part, and numerals 4 and 5 indicate weft yarn and warp yarn, respectively. Discrete yarn part 3 is the hatched part surrounded by the lines (1) and (2).

When hose is produced by weaving yarns, either the warp or the weft is usually in parallel with the lengthwise direction of the hose, and the other is in parallel with the widthwise direction of the hose. However, according to the weaving conditions or the processing after weaving, the yarns which should be in parallel with the widthwise direction of the hose may wave as shown in FIG. 1, in which wefts 4 wave.

Figure 3:
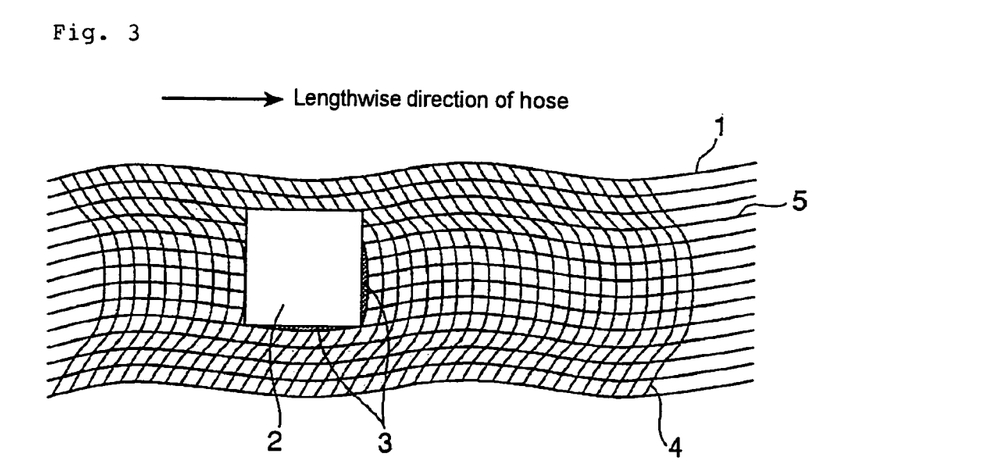
FIG. 3 schematically shows a hole of a hose for introducing and distributing inflator gas and a portion around the hole when yarns in parallel with the lengthwise direction of the hole are waving.

The yarns, which should be in parallel with the lengthwise direction of the hose, may wave (see FIG. 3). When a hole is perforated in the case where the degree of waving of the yarns is large, part 3 occupied by warp lint and/or weft lint, which are generated by cutting yarns constituting parts other than the hole, is formed near the inner periphery of the hole. Such a part is firstly found by the inventors and is called "discrete yarn part" in this application.

Figure 2:
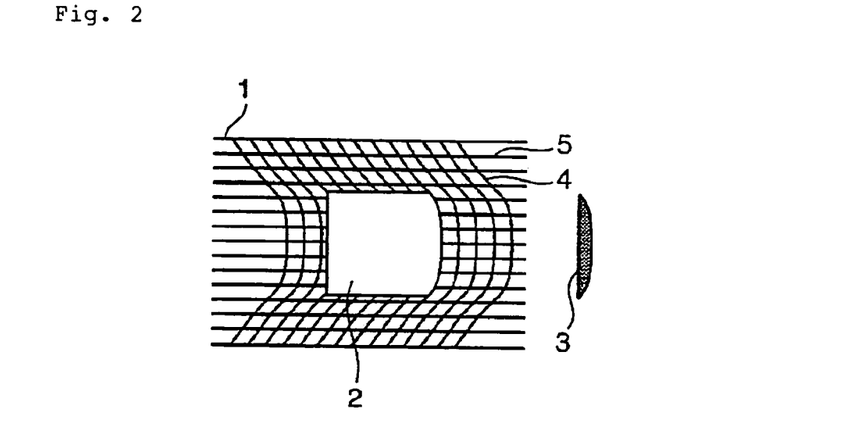
FIG. 2 schematically shows the hole of FIG. 1 after the flow of the inflator gas.

Since the yarn lint constituting the discrete yarn part (hereinafter referred to as "discrete yarn") is discontinuous from the yarns constituting the other part of the hose, the discrete yarn part does not form the complete woven structure. Since such a discrete yarn part has a very low constraining force, it is easily removed from the hose and scattered (see FIG. 2). As a result, the hole is enlarged or deformed, so that the air bag is less adequately deployed.

The total area $S_1$ of the discrete yarn parts is preferably 30% or less, more preferably 20% or less, most preferably 10% or less, of the area $S_0$ of the hole. When the total area $S_1$ of the discrete yarn parts exceeds the above upper limit, the hole is largely deformed or enlarged by the scattering of the yarn in the discrete yarn part. Therefore, the inflator gas may not be distributed as designed and the deploying form of the air bag may become less uniform during the deployment of the air bag. In particular, when the air bag has several compartments, the deformation of the hole causes the concentration of the inflator gas in some compartments resulting in the burst of the air bag.

The area $S_1$ of the discrete yarn part can be measured as follows.

Firstly, the hose is opened in parallel with the lengthwise direction of the hose without including the hole, and expanded so that the hole area is flattened as shown in FIG. 1. Next, a part surrounded by the above-defined (1) and (2) (discrete yarn part) is colored. Then, the lengths of lines which are required to calculate the area of the colored part are measured, and an area of the colored part is calculated from the measured lengths. If the shape of the discrete yarn part is complicated and it is difficult to measure such lengths, the colored yarns of the discrete yarn part are weighed. Then, the weight of the discrete yarn part is compared with the weight of a fabric sample having a known area to calculate the area of the discrete yarn part.

The hose of the fourth invention is characterized in that one sheet of woven fabric constituting the hose has a thickness t of 0.9 to 3 mm, and a loop hardness Lh (unit: N) and the thickness t (unit: mm) of the single fabric has the following relationship:

$$Lh/t \leq 5 \ (N/mm)$$

when measured according to a loop-compression method defined in JIS L1096, 8.20.3 with a rectangular sample having a length of 5 cm and a width of 2 cm which is cut out from the hose such that the shorter side of the sample is in parallel with the lengthwise direction of the hose.

The ratio Lh/t is preferably 5 N/mm or less, more preferably 4 N/mm or less. When this ratio exceeds 5 N/mm, the hose hardness is too large in relation to the thickness of the hose wall, and thus it is difficult to fold the hose. The air bag including such a hose is difficult to be made small and thus the size of the air bag after installation increases.

The ratio Lh/t may be preferably at least 1 N/mm, more preferably at least 1.5 N/mm, particularly preferably at least 2 N/mm. When this ratio is smaller than 1 N/mm, the hose hardness may be too small in relation to the thickness of the hose wall so that the hose may bounce due to the counteraction of the flow of high pressure gas so that the inflator gas is inadequately distributed in the air bag cushion, or the hose may not have sufficient strength.

The thickness t of the fabric constituting the hose is preferably at least 0.9 mm, more preferably at least 1.0 mm, most preferably at least 1.2 mm. With such a thickness, the hose is not broken or burst when a large force is applied by the high pressure gas. When the thickness of the fabric is less than 0.9 mm, the hose may have insufficient strength. In view of the receivability of the hose, the thickness of the hose wall is preferably 3 mm or less, more preferably 2 mm or less, most preferably 1.5 mm or less. The thickness of the hose wall may be selected from the above range depending on the type of the inflator.

The loop hardness Lh is preferably at least 1 N, more preferably at least 2 N, particularly preferably at least 3 N, while it is preferably 20 N or less, more preferably 15 N or less, particularly preferably 10 N or less. When the loop hardness exceeds the above upper limit, the hose is very hard and it may be difficult to fold the hose. When the loop hardness is less than the above lower limit, the hose may easily be broken by the high pressure of the inflator gas.

The hose of the present invention preferably has a loop repulsion rate Lr of 60% or less, when Lr is measured by the loop-compression method defined in JIS L1096, 8.20.3. The loop repulsion rate Lr means a repulsing property of the hose against external force. The larger repulsion rate means the higher repulsing property of the hose.

As already described, the hose is folded or wound and received in the air bag cushion and assembled in the form of an air bag module, before the module is mounted in the car. When the hose has a high repulsing property, the folded hose tends to recover its original shape so that the module may be deformed. To prevent the deformation of the module, it is preferable for the hose to have a smaller repulsing property. Thus, the loop repulsion rate Lr is preferably 50% or less, more preferably 40% or less.

When Lr exceeds the above upper limit, the force to recover the original shape of the hose increases so that the shape of the air bag module containing the hose may not be fixed and thus the workability of the module may deteriorate when the air bag module is mounted in the car.

At least one hole, which is used to distribute the inflator gas in the air bag, may be formed in the wall of the hose which may optionally coated with the coating agent. The number of holes is not limited and is selected by taking the size of the air bag, the inflated shape of the air bag, etc. into account. The opening area of the hole is preferably from 0.25 to 16 $cm^2$, more preferably from 1 to 9 $cm^2$. When the opening area of the hose exceeds 16 $cm^2$, the large amount of the inflator gas may flow through such a large hole so that a part of the hose near such a hole is locally heated and the breakage of the hose may start from such a part. Thus, the deployed shape of the air bag may become less uniform resulting in the breakage of the air bag. When the opening area of the hole is less than 0.25 $cm^2$, a large number of holes should be formed to instantaneously deploy the air bag, which requires long time and large cost.

The shape of the hole for introducing the gas is not limited. For example, the hole may be a square or a rectangle the sides of which are in parallel with the lengthwise and widthwise directions of the hose, a quadrangle the diagonals of which are in parallel with the lengthwise and widthwise directions of the hose, a triangle, a form having curved sides, etc. (see FIG. 5).

Figure 5:
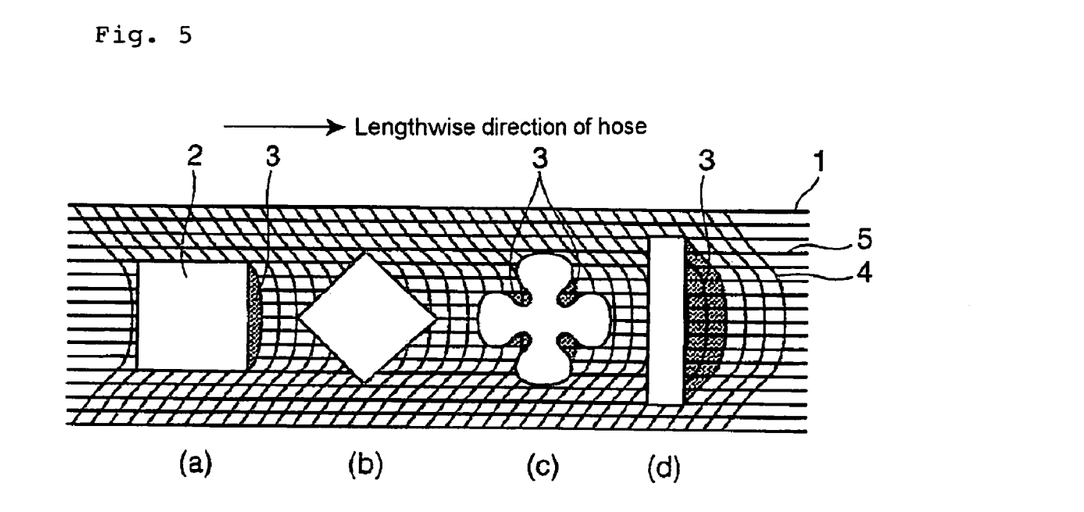
FIG. 5 schematically shows specific examples of the shape of a hole of a hose for introducing and distributing inflator gas according to the present invention.

In FIG. 5, discrete yarn part 3 is hatched. In the third invention, when the waving state of the yarns constituting the hose is the same, the area of the discrete yarn part varies with the shape of the hole. Therefore, to suppress the formation of the discrete yarn part or to reduce the area of such a part, it is effective to select the shape of the hole. Preferably, the hole is a square the sides of which are substantially in parallel with the lengthwise and widthwise directions of the hose, or a square the diagonals of which are substantially in parallel with the lengthwise and widthwise directions of the hose. Here, the term "substantially in parallel" means that the sides or diagonals of the square may not be exactly in parallel with the lengthwise and widthwise directions of the hose, but allows slight deviation from the exactly parallel positions.

The number and positions of the holes are appropriately selected. In addition, the size of each hole is adequately adjusted at a position near the inflator and a position remote from the inflator so that the air bag is uniformly deployed. Thereby, the inflated shape of the air bag can be controlled.

In the case of the hoses of the second and fourth inventions, any hole may not be formed, if one end of the hose is connected with the inflator, while the other end is used to introduce the inflator gas into the air bag cushion.

In the production of the hose of the present invention, it is preferable to form a reinforced part around the periphery of the hole to increase the strength of the peripheral part of the hole. The reinforced part may be formed (i) by cutting the fabric with a laser beam while melting the fibers of the periphery of the hole, (ii) by contacting a heating device directly to the inner periphery of the hole to melt the fibers of the periphery of the hole, or (iii) by applying an adhesive to the inner periphery of the hole.

When the reinforced part is formed using an adhesive, the adhesive may be directly applied to the cross section of the perforated hole, or the adhesive is applied to an area within 1 cm from the perforated line (the inner edge of the hole) on the outer or inner side of the hose and then solidified. Thereby, the strength of the reinforced part is further increased. Any adhesive may be used to form the reinforced part. Preferably, an adhesive which can be solidified in a short time such as an instantaneous adhesive is used. An example of the instantaneous adhesive is a cyanoacrylate adhesive, which exhibits adhesiveness in a short time and has good heat resistance, for example, 3000 DX series of CEMEDINE Co., Ltd.

To suppress the enlargement of the hole, it is effective to optimize the weaving structure of the fabric around the hole, for example, forming a part surrounding the hole with a plain weave.

To further increase the strength of the reinforced part, it is advantageous to contact a heating device to the cross section of the perforated hole with pressing the fabric by a distance of about 1 mm to melt the yarns.

As a heating devicer, a heating iron, a heating block, etc. may be used.

In general, the air bag is deployed with the gas supplied from the inflator and protects the passenger by holding him or her when the car is collided. Therefore, the air bag should withstand the quick expansion caused by the introduction of the inflator gas and also the impact against the passenger in case of collision, and also generate smaller impact on the passenger. From these viewpoints, the air bag is preferably made of a woven fabric of polyamide fiber or polyester fiber.

The surface of the air bag may be coated with a coating agent such as a rubber or a synthetic resin to prevent the gas leakage from the air bag or to improve various properties such as strength as in the case of the hose for introducing and distributing the inflator gas. The coating agent used to coat the air bag may be the same as those used to coat the hose.

The yarn used to produce the air bag may be a twisted yarn or a finished yarn, and it may be a multifilament or a monofilament. The total fineness of the yarn is preferably at least 200 dtex, more preferably at least 300 dtex, and does not exceed preferably 600 dtex, more preferably 500 dtex. When the total fineness exceeds the above upper limit, the air bag may become bulky so that the compactness of the air bag may deteriorate. When the total fineness is less than the above lower limit, the fabric may not have sufficient strength for the air bag, and the air bag may burst even if the distribution of the inflator gas is controlled by forming a number of holes.

The multifilament constituting the side air bag preferably has a single filament diameter of 2 to 10 dtex, more preferably 3 to 6 dtex. When the single filament diameter exceeds 10 dtex, the fabric is too rigid so that the receivability of the air bag decreases and also impact against the passenger increases when the air bag is inflated. When the single filament is less than 2 dtex, the single filament may be broken during weaving.

The air bag itself may be produced by any conventional weaving method.

The hose for introducing and distributing inflator gas according to the present invention is installed in the air bag cushion and then the one open end of the hose is connected with the inflator. The air bag cushion and the hose may be integrated by sewing or adhering the edge of the hose with the air bag cushion, although they may not be integrated since the hose is fixed to the inflator.

Then, the side air bag is folded and mounted in the center pillar or the front pillar of the car.

While the hose for introducing and distributing inflator gas according to the present invention is installed in the side air bag, it may be installed in other type of air bags such as a head-on air bag used to protect the driver or passenger in the case of head-on collision, a knee bag for protecting knees, etc.

Furthermore, the hose according to the present invention may be used in any apparatus where a part of the hose is placed outside a bag, for example, when it is used to connect the inflator and the bag.

EXAMPLES

The present invention will be illustrated by the following examples, which do not limit the scope of the invention in any way.

In the examples, the properties are evaluated or measured as follows:

Fraying test of a hole after introducing high pressure gas through the hose

Nitrogen gas, which was pressurized to 800 kPa initially in a volume of 5 liters, was injected in a hose for introducing and distributing gas from one open end with the other end of the hose being closed by sewing. Then, the state of holes for distributing gas was observed.

The hose had an inner diameter of 4.5 cm and a length of 2 m, and five holes having different shapes were formed at an interval of 30 cm from the gas inlet end.

The fraying state of the hole closest to the gas inlet end of the hose was evaluated according to the following criteria, and the hole with "A", "B" or "C" was ranked "pass".

A: Substantially no change of the shape of the hole is observed
B: Slight change of the shape of the hole is observed
C: Small change of the shape of the hole is observed
D: Large change of the shape of the hole is observed
E: Very large change of the shape of the hole is observed Maximum drawing resistance A maximum drawing resistance was measured according to JIS L1096, 8.21.3 (pin-hitching method).

A warp or weft direction sample with a width of 3 cm and a length of 5 cm was cut out from a fabric constituting a hose with the widthwise direction (3 cm) of the sample being perpendicular to the weft or warp direction of the fabric and the periphery of the hole being as one side of the sample. Then, pins were inserted along a line apart from the edge including the periphery of the hole of the sample by 3 mm, and the sample was attached to a fabric testing machine with 5 mm distance between one head and the pin position and pulled at a pulling rage of 15 cm/min. to measure the maximum force as the maximum drawing resistance.

Hose fluttering test when high pressure gas is introduced in a hose

Nitrogen gas, which was pressurized to 800 kPa initially in a volume of 5 liters, was injected in a hose for introducing and distributing gas from one open end with the other end of the hose being closed by sewing. Then, the fluttering condition of hose caused by the counteraction of the gas was observed.

The fluttering condition of the hose was evaluated according to the following criteria, and the hose with "A", "B" or "C" was ranked "pass".

A: The hose is stable and very slightly flutters
B: The hose is fairly stable and slightly flutters
C: The hose is slightly moved but does not bounce
D: The hose bounces
E: The hose bounces very hardly Bending resistance of a hose Three samples each having a width of 3 cm and a length of 25 cm were cut out from three different parts of a hose sample as a single layer, which was straightly expanded without any holes for distributing gas. Then, the bending resistance of each sample in the lengthwise direction of the hose was measured by JIS L1096, 8.19.1 A method (45 degrees cantilever method). With each sample, the bending resistance was measured on the surface side and the back face side and the measured values were averaged, and the averaged value was used as a bending resistance of each sample. Then, the bending resistances of the three samples were averaged.

Total area $S_1$ of discrete yarn parts

A hose was opened by cutting the hose in parallel with its lengthwise direction without including a hole for distributing gas, and expanded so that a part including the hole was flattened. An area $S_1$ ($cm^2$) of discrete yarn parts each surrounded by the following (1) and (2) was measured:

(1) Edges of the hole perforated
(2) Discrete yarn having the longest length among discrete yarns remaining on the hose, the both ends of which were cut when the hole was perforated and which intersect the edge of the hole.

Then, a percentage of $S_1$ per the area $S_0$ ($cm^2$) of the hole was calculated according to the following formula:

$(S_1/S_0) \times 100$

When this percentage was 30% or less, the hose was ranked "pass".

Weft skew of a hose in its widthwise direction

Weft skew was measures according to JIS L1096, 8.11.

A hose of a woven fabric was pressed in a flat form, and a straight line perpendicular to the lengthwise direction of the hose was drawn from one edge in the widthwise direction to the other. The length of this line was used as "a" (mm) in the method of JIS L1096, 8.11, and a weft skew (%) was calculated. The weft skew values were measured at three points and averaged.

Loop hardness Lh and loop repulsion rate Lr (%)

Five samples each having a length of 5 cm and a width of 2 cm were cut out from a hose such that the shorter side of each sample was in parallel with the lengthwise direction of the hose. Then, a loop hardness and a loop repulsion rate were measured according to a loop-compression method defined in JIS L1096, 8.20.3.

In the measurement, a pressure finger was set such that the coated surface of the hose was in contact with the pressure finger, and the measuring conditions were as follows:

Head speed: 50 mm/min.
Chart speed: 500 mm/min.
L1: 20 mm
L2: 5 mm

The measured loop hardness values and loop repulsion rates were averaged with the five samples.

Then, the ratio of the loop hardness Lh to the thickness t of the hose wall (fabric thickness) (Lh/t) was calculated.

Thickness of a hose wall

A thickness of one sheet fabric of a hose after coating was measured according to JIS L1096 8.5.1.

Corrected weight of a hose ($g/m^2$)

The corrected weight of a hose after coating was measured according to JIS L1096, 8.4.1.

Folding easiness of a hose

A hose having an outer diameter of 48 mm and a length of 40 cm was completely inserted in an air bag having an inner diameter of 50 mm and a length of 40 cm (tube form woven fabric of Nylon 66 using 350 dtex/108 f yarn; warp density: 59 thread/2.54 cm; weft density: 59 thread/2.54 cm). Then, the composite of the hose and the air bag was flattened and folded at the center line along the lengthwise direction of the hose, and again folded at the center of the once folded composite. During the folding, the folding easiness was evaluated according to the following criteria:

A: The composite can be easily folded twice
B: Folding is difficult, but the composite can be folded by force
C: The composite can not be folded
Bulkiness of a hose A hose having an outer diameter of 48 mm and a length of 40 cm was folded at its center line along its lengthwise direction, and fixed in the folded state by binding the hose with a tape or a rubber band at positions 10 cm apart from the respective ends of the hose. With some hoses, the lengthwise edges of the hose were not in contact with each other. In such a case, the maximum distance (mm) between the separated edges was measured. When this distance exceeded 45 mm, the hose was regarded as bulky and had poor receivability.

Example 1

Polyamide 66 fiber having a tenacity of 8.0 cN/dtex was used. As warp yarn, 5×470 dtex (72 filaments) twisted yarn was used, and as weft yarn, a pair of 5×470 dtex (72 filaments) twisted yarns were used so that 10×470 dtex twisted was apparently present in a hose. Using such warp and weft yarns, a jacket (an uncoated tube-form fabric) was woven by a needle loom with an interwoven selvage width of 4 mm and a width of 7.5 cm (a tube diameter of 4.5 cm). The woven fabric had a warp density of 74 thread/2.54 cm, and a weft density of 10.5 thread/2.54 cm.

The jacket was flattened and dipped in a coating agent (silicone resin: ELASTOSIL M-4640 manufactured by WACKER) containing an additive (Adhesion Promoter HF86 manufactured by WACKER) and pulled out. The hose was then squeezed with a squeezing plate to remove the excessive coating agent so that the coated amount of the coating agent was made uniform. Thereby, the both outer sides of the flattened hose were coated with the coating agent (silicone resin). Thereafter, the coating agent was cured at 170° C. for 2 minutes and cut to a length of 2 m. The coated amount of the coating agent was 45 g/m.

One end of the hose was closed by sewing. Then, five square holes each having a side length of 3 cm were perforated on the side of the hose having no selvage at an interval of 30 cm from the unclosed end. A heating iron was contacted to the inner edges of the holes, that is, the cut surfaces of the warp and weft yarns, to heat them at 500° C. for 8 seconds to melt the yarns together. Thereby, the reinforced part was formed on the inner peripheral edges of the holes. Each side of the square hole was perpendicular to either the warp direction or the weft direction of the fabric.

With the produced hose, the fraying of yarns after the introduction of high-pressure gas and the maximum drawing resistance were measured. The results are shown in Table 1.

Example 2

Polyamide 66 fiber having a tenacity of 8.0 cN/dtex was used. As warp yarn, 2×350 dtex (108 filaments) twisted yarn was used, and as weft yarn, a pair of 3×350 dtex (108 filaments) twisted yarns were used so that 6×350 dtex twisted yarn was apparently present in a hose. Using such warp and weft yarns, a jacket was woven by a needle loom with an interwoven selvage width of 2 mm and a width of 7.3 cm (a tube diameter of 4.5 cm). The woven fabric had a warp density of 90 thread/2.54 cm, and a weft density of 16.5 thread/2.54 cm.

The tube-form fabric was coated with the coating agent and the holes were formed in the same manner as in Example 1 to obtain a hose for introducing and distributing inflator gas. The coated amount of the coating agent was 30 g/m.

With the produced hose, the fraying of yarns after the introduction of high-pressure gas and the maximum drawing resistance were measured. The results are shown in Table 1.

Example 3

Polyester fiber having a tenacity of 8.0 cN/dtex was used. As warp yarn, 8×280 dtex (96 filaments) twisted yarn was used, and as weft yarn, a pair of 8×280 dtex (96 filaments) twisted yarns were used so that 16×280 dtex twisted yarn was apparently present in a hose. Using such warp and weft yarns, a jacket was woven by a needle loom with an interwoven selvage width of 4 mm and a width of 7.5 cm (a tube diameter of 4.5 cm). The woven fabric had a warp density of 77 thread/2.54 cm, and a weft density of 11 thread/2.54 cm.

The tube-form fabric was coated with the coating agent and the holes were formed in the same manner as in Example 1 to obtain a hose for introducing and distributing inflator gas. The coated amount of the coating agent was 55 g/m. In this Example, no reinforced part was formed on the inner peripheral edges of the holes.

With the produced hose, the fraying of yarns after the introduction of high-pressure gas and the maximum drawing resistance were measured. The results are shown in Table 1.

Example 4

Polyamide 66 fiber having a tenacity of 8.0 cN/dtex was used. As warp yarn, 5×470 dtex (72 filaments) twisted yarn was used, and as weft yarn, a pair of 5×470 dtex (72 filaments) twisted yarns were used so that 10×470 dtex twisted yarn was apparently present in a hose. Using such warp and weft yarns, a jacket was woven by a needle loom with an interwoven selvage width of 4 mm and a width of 7.5 cm (a tube diameter of 4.5 cm). The woven fabric had a warp density of 74 thread/2.54 cm, and a weft density of 10.5 thread/2.54 cm.

The tube-form fabric was coated with the coating agent and the holes were formed in the same manner as in Example 1 to obtain a hose for introducing and distributing inflator gas. The coated amount of the coating agent was 11 g/m. In this Example, no reinforced part was formed on the inner peripheral edges of the holes.

With the produced hose, the fraying of yarns after the introduction of high pressure gas and the maximum drawing resistance were measured. The results are shown in Table 1.

TABLE 1

|  |  | Example No. | | | |
| --- | --- | --- | --- | --- | --- |
|  |  | 1 | 2 | 3 | 4 |
| Yarn material |  | Polyamide 66 | Polyamide 66 | Polyester | Polyamide 66 |
| Yarn fineness | Warp | 2350 | 700 | 2240 | 2350 |
| (dtex) | Weft | 4700 | 2100 | 4480 | 4700 |

TABLE 1-continued

| | | Example No. | | | |
|---|---|---|---|---|---|
| | | 1 | 2 | 3 | 4 |
| Weaving density (thread/2.54 cm) | Warp | 74 | 90 | 77 | 74 |
| | Weft | 10.5 | 16.5 | 11 | 10.5 |
| Hose weight prior to coating (g/m) | | 138 | 55 | 165 | 136 |
| Coating agent | | | | | |
| Coated amount (g/m) | | 45 | 30 | 55 | 11 |
| Coating percentage (per jacket weight) | | 32.6% | 54.5% | 33.3% | 8.1% |
| Amount of additive (parts by weight) | | 2 | 2 | 2 | 2 |
| Coated surface | | Outer surface | Outer surface | Outer surface | Outer surface |
| Conditions in forming reinforced part | | 500° C. × 8 sec. | 500° C. × 8 sec. | None | None |
| Max. drawing resistance in direction of | Warp | 250 N/3 cm | 150 N/3 cm | 90 N/3 cm | 55 N/3 cm |
| | Weft | 655 N/3 cm | 530 N/3 cm | 360 N/3 cm | 210 N/3 cm |
| Fraying of hole | | A | B | C | E |

As can be seen from the results of Table 1, the hoses for distributing inflator gas of Examples 1, 2 and 3, which satisfied the conditions of the first invention, did not suffer from the deformation of hole shapes, and the peripheral parts of the holes were not damaged. In particular, with the hoses of Examples 1 and 2, the reinforced parts were formed on the inner peripheries of the holes by melting together the yarns. Therefore, the strength of the holes was further increased, and the damage of the peripheral parts of the holes was effectively prevented. With the hose of Example 3, no reinforced part was formed but the coating of the coating agent imparted the sufficient strength to the peripheral parts of the holes so that the holes were not deformed substantially.

With the hose of Example 4, the amount of the coating agent was insufficient. Thus, the peripheral parts of the holes did not have sufficient strength so that the breakage of the holes could not be prevented.

Example 5

Polyamide 66 fiber having a tenacity of 8.1 cN/dtex was used. As warp yarn, 5×470 dtex (72 filaments) twisted yarn was used, and as weft yarn, a pair of 3×350 dtex (108 filaments) twisted yarns were used so that 6×350 dtex twisted yarn was apparently present in a hose. Using such warp and weft yarns, a jacket was woven by a needle loom with an interwoven selvage width of 4 mm and a width of 7.5 cm (a tube diameter of 4.5 cm). The woven fabric had a warp density of 70 thread/2.54 cm, and a weft density of 15 thread/2.54 cm. The cover factor was 3,393 in the warp direction and 687 in the weft direction.

The jacket was flattened and dipped in a coating agent (a mixture of silicone resin ELASTOSIL LR 6200 and ELASTOSIL LR 3003 (weight ratio of 4:1) both manufactured by WACKER) containing an additive (Adhesion Promoter GF86 manufactured by WACKER) and pulled out. The hose was then squeezed with a squeezing plate to remove the excessive coating agent so that the coated amount of the coating agent was made uniform. Thereby, the both outer sides of the flattened hose were coated with the coating agent. Then, the coating agent was cured at 180° C. for 3 minutes and the hose was cut to a length of 1 m. The coated amount of the coating agent was 43 g/m.

One end of the hose was closed by sewing using a resin-coated Nylon 66 thread with one reciprocation. Then, on the side of the hose having no selvage, one square hole having a side length of 3 cm was perforated at a position of 40 cm from the open end, and two further square holes each having a side length of 3 cm were perforated on the same side of the hose at an interval of 20 cm from the above first hole. A heating iron was contacted to the inner edges of the holes, that is, the cut surfaces of the warp and weft yarns, to heat them at 500° C. for 4 seconds to melt the yarns together. Thereby, the reinforced part was formed on the inner peripheral edges of the holes. Each side of the square hole was perpendicular to either the warp direction or the weft direction of the fabric.

With the produced hose, the fluttering of the hose and the bending resistance of the hose were measured. The results are shown in Table 2.

Example 6

Polyamide 66 fiber having a tenacity of 8.1 cN/dtex was used. As warp yarn, 3×235 dtex (108 filaments) twisted yarn was used, and as weft yarn, 8×235 dtex (108 filaments) twisted yarn was used. Using such warp and weft yarns, a jacket was woven by a shuttle loom with a width of 7.1 cm (a tube diameter of 4.5 cm). The woven fabric had a warp density of 92 thread/2.54 cm, and a weft density of 18 thread/2.54 cm. The cover factor was 2,443 in the warp direction and 780 in the weft direction.

The tube-form fabric was coated with the coating agent and the holes were formed in the same manner as in Example 5 to obtain a hose for introducing and distributing inflator gas. The coated amount of the coating agent was 30 g/m.

With the produced hose, the fluttering of the hose and the bending resistance of the hose were measured. The results are shown in Table 2.

Example 7

Polyamide 66 fiber having a tenacity of 8.1 cN/dtex was used. As warp yarn, yarn of 470 dtex/72 f was used, and as weft yarn, yarns of 470 dtex/24 f was used. Using such warp and weft yarns, a wide woven fabric (width: 150 cm) was fabricated by a rapier loom. The woven fabric had a warp density of 46 thread/2.54 cm, and a weft density of 46 thread/2.54 cm. The cover factor was 997 in the warp direction and 997 in the weft direction.

On the one surface of the woven fabric, the same coating agent as one used in Example 5 was coated (coated amount: 60 g/m$^2$) and cured at 180° C. for 3 minutes. Then, three woven fabrics were laminated or piles up with facing the coated surfaces upward and the warp and weft directions of the fabrics being in the same directions. The laminate of the fabrics was cut so that the weft direction of the fabrics having the greater bending resistance was in accord with the lengthwise direction of a hose to be produced, and sewed in three lines with the coated surface facing inside to obtain a hose having a width of 7.7 cm (hose diameter: 4.5 cm) and a length of 1 m.

Thereafter, the holes were perforated in the same manner as in Example 5 obtain a hose for introducing and distributing inflator gas. The total coated amount of the coating agent of the three fabrics was 28 g/m.

With the produced hose, the fluttering of the hose and the bending resistance of the hose were measured. The results are shown in Table 2.

Example 8

Polyamide 66 fiber having a tenacity of 8.1 cN/dtex was used. As warp yarn, 5×470 dtex (288 filaments) twisted yarn was used, and as weft yarn, a pair of 3×350 dtex (108 filaments) twisted yarns were used so that 6×350 dtex twisted yarn was apparently present in a hose. Using such warp and weft yarns, a jacket was woven by a needle loom with an interwoven selvage width of 4 mm and a width of 7.5 cm (a tube diameter of 4.5 cm). The woven fabric had a warp density of 68 thread/2.54 cm, and a weft density of 15 thread/2.54 cm. The cover factor was 3,296 in the warp direction and 687 in the weft direction.

The tube-form fabric was coated with the same coating agent as one used in Example 5, and cut to a length of 1 m. Then, the holes were formed in the same manner as in Example 5 to obtain a hose for introducing and distributing inflator gas. The coated amount of the coating agent was 35 g/m.

With the produced hose, the fluttering of the hose and the bending resistance of the hose were measured. The results are shown in Table 2.

Example 9

Polyamide 66 fiber having a tenacity of 8.1 cN/dtex was used. As warp yarn, 3×235 dtex (108 filaments) twisted yarn was used, and as weft yarn, 8×235 dtex (108 filaments) twisted yarn was used. Using such warp and weft yarns, a jacket was woven by a shuttle loom with a width of 7.1 cm (a tube diameter of 4.5 cm). The woven fabric had a warp density of 68 thread/2.54 cm, and a weft density of 18 thread/2.54 cm. The cover factor was 1,806 in the warp direction and 780 in the weft direction.

The tube-form fabric was coated with the same coating agent as one used in Example 5, and cut to a length of 1 m. Then, the holes were formed in the same manner as in Example 5 to obtain a hose for introducing and distributing inflator gas. The coated amount of the coating agent was 40 g/m.

With the produced hose, the fluttering of the hose and the bending resistance of the hose were measured. The results are shown in Table 2.

Comparative Example 1

Polyamide 66 fiber having a tenacity of 8.1 cN/dtex was used. As warp yarn, 5×470 dtex (288 filaments) twisted yarn was used, and as weft yarn, a pair of 3×350 dtex (108 filaments) twisted yarns were used so that 6×350 dtex twisted yarn was apparently present in a hose. Using such warp and weft yarns, a jacket was woven by a needle loom with an interwoven selvage width of 4 mm and a width of 7.5 cm (a tube diameter of 4.5 cm). The woven fabric had a warp density of 68 thread/2.54 cm, and a weft density of 15 thread/2.54 cm. The cover factor was 3,296 in the warp direction and 687 in the weft direction.

The tube-form fabric was coated with the same coating agent as one used in Example 5, and cut to a length of 1 m. Then, the holes were formed in the same manner as in Example 5 to obtain a hose for introducing and distributing inflator gas. The coated amount of the coating agent was 19 g/m.

With the produced hose, the fluttering of the hose and the bending resistance of the hose were measured. The results are shown in Table 2.

Comparative Example 2

Polyamide 66 fiber having a tenacity of 8.1 cN/dtex was used. As warp yarn, 3×235 dtex (108 filaments) twisted yarn was used, and as weft yarn, 8×235 dtex (108 filaments) twisted yarn was used. Using such warp and weft yarns, a jacket was woven by a shuttle loom with a width of 7.1 cm (a tube diameter of 4.5 cm). The woven fabric had a warp density of 68 thread/2.54 cm, and a weft density of 18 thread/2.54 cm. The cover factor was 1,806 in the warp direction and 780 in the weft direction.

The tube-form fabric was coated with the same coating agent as one used in Example 5, and cut to a length of 1 m. Then, the holes were formed in the same manner as in Example 5 to obtain a hose for introducing and distributing inflator gas. The coated amount of the coating agent was 12 g/m.

With the produced hose, the fluttering of the hose and the bending resistance of the hose were measured. The results are shown in Table 2.

TABLE 2

|  | Ex. 5 | Ex. 6 | Ex. 7 | Ex. 8 | Ex. 9 | C. Ex. 1 | C. Ex. 2 |
|---|---|---|---|---|---|---|---|
| Yarn material | Polyamide 66 | | | | | | |
| Yarn fineness (dtex) | | | | | | | |
| Warp (total fineness) | 2350 | 705 | 470 | 2350 | 705 | 2350 | 705 |
| Warp (single filament fineness) | 13.1 | 2.2 | 6.5 | 1.6 | 2.2 | 1.6 | 2.2 |
| Weft (total fineness) | 2100 | 1880 | 470 | 2100 | 1880 | 2100 | 1880 |
| Weft (single filament fineness) | 3.2 | 2.2 | 19.6 | 3.2 | 2.2 | 3.2 | 2.2 |
| Weaving density (thread/2.54 cm) | | | | | | | |
| Warp direction | 70 | 92 | 46 × 3[1)] | 68 | 68 | 68 | 68 |
| Weft direction | 15 | 18 | 46 × 3[1)] | 15 | 18 | 15 | 18 |
| CF in lengthwise direction | 3393 | 2443 | 2991 (997 × 3[1)]) | 3296 | 1806 | 3296 | 1806 |
| Hose weight prior to coating (g/m) | 115 | 67 | 102 | 112 | 59 | 112 | 59 |
| Coating agent | | | | | | | |
| Coated amount (g/m) | 43 | 30 | 28 | 35 | 40 | 19 | 12 |
| Coating percentage (%) | 37.4 | 44.8 | 27.5 | 31.3 | 67.8 | 17 | 20.3 |
| Amount of additive (pbw) | 2 | 2 | 2 | 2 | 2 | 2 | 2 |
| Bending resistance in lengthwise direction (mm) | 280 | 175 | 107 | 101 | 102 | 92 | 65 |
| Fluttering of hose | A | B | C | C | C | D | E |

Note:
[1)]"× 3" means that a three-ply laminate of woven fabrics was used.
The cover factor in lengthwise hose direction of a single woven fabric used in Example 7 was 997

As can be seen from the results in Table 2, the hoses for distributing inflator gas of Examples 5 to 9, which satisfied the conditions of the second invention had good bending resistance in the lengthwise direction of the hose, and did not flutter when the high pressure gas was introduced. In particular, the hose of Example 5 could effectively suppress fluttering since the warp yarn present in the lengthwise direction of the hose had a large single filament fineness and the cover factor was large in the lengthwise direction of the hose.

The hoses of Comparative Examples 1 and 2 had low bending resistance and thus could not prevent the fluttering of the hose.

Example 10

Polyamide 66 fiber having a tenacity of 8.1 cN/dtex was used. As warp yarn, 5×470 dtex (72 filaments) twisted yarn was used, and as weft yarn, a pair of 5×470 dtex (72 filaments) twisted yarns were used so that 10×470 dtex twisted yarn was apparently present in a hose. Using such warp and weft yarns, a jacket was woven by a needle loom with an interwoven selvage width of 4 mm and a width of 7.5 cm. The tubular woven fabric was wound using plural rolls which were arranged substantially in-line so that the tubular woven fabric did not bend. The single woven fabric had a warp density of 74 thread/2.54 cm (2,350 dtex) and a weft density of 10 thread/2.54 cm (4,700 dtex). The cover factor was 3,587 in the warp direction and 720 in the weft direction.

The jacket was flattened and dipped in a coating agent (a mixture of silicone rubber ELASTOSIL LR 6200 and ELASTOSIL LR 3003 (weight ratio of 3:1) both manufactured by WACKER) containing an additive (Adhesion Promoter GF86 manufactured by WACKER) and pulled out. The hose was then squeezed with a squeezing plate to remove the excessive coating agent so that the coated amount of the coating agent was made uniform. Thereby, the both outer sides of the flattened hose were coated with the coating agent. Then, the coating agent was cured at 170° C. for 2 minutes and the hose was cut to a length of 2 m. The coated amount of the coating agent was 45 g/m.

One end of the hose was closed by sewing. Then, on the side of the hose having no selvage, five square holes having a side length of 3 cm were perforated at an interval of 30 cm from the open end of the hose. A heating iron was contacted to the inner edges of the holes, that is, the cut surfaces of the warp and weft yarns, to heat them at 500° C. for 8 seconds to melt the yarns together. Each side of the square hole was perpendicular to either the warp direction or the weft direction of the fabric.

With the produced hose, the total area of the discrete yarn parts, the fraying of the yarns and the weft skew were measured and evaluated. The results are shown in Table 3.

Example 11

Polyamide 66 fiber having a tenacity of 8.1 cN/dtex was used. As warp yarn, 2×350 dtex (108 filaments) twisted yarn was used, and as weft yarn, 6×350 dtex (108 filaments) twisted yarn was used. Using such warp and weft yarns, a jacket was woven by a shuttle loom with a width of 7.3 cm. The tubular woven fabric was wound using plural rolls which were arranged substantially in-line so that the tubular woven fabric did not bend. The single woven fabric had a warp density of 90 thread/2.54 cm (700 dtex) and a weft density of 14.5 thread/2.54 cm (2,100 dtex). The cover factor was 2,381 in the warp direction and 664 in the weft direction.

The tubular woven fabric was coated by the coating agent in the same manner as in Example 10 with a coated amount of 30 g/m and cut to a length of 2 m. Then, the holes were perforated in the same manner as in Example 10 except that each diagonal of each square hole was in parallel with either the lengthwise direction or the widthwise direction of hose (see FIG. 5, Shape (b)).

Then, an adhesive (3000 DX SERIES manufactured by Cemedine Co., Ltd.) was applied to an area with a distance of 0.5 cm from the inner edge of each hole and solidified to obtain a hose for distributing inflator gas.

With the produced hose, the total area of the discrete yarn parts, the fraying of the yarns and the weft skew were measured and evaluated. The results are shown in Table 3.

Example 12

Polyamide 66 fiber having a tenacity of 8.1 cN/dtex was used. As warp yarn, 5×470 dtex (72 filaments) twisted yarn was used, and as weft yarn, 10×470 dtex (72 filaments) twisted yarn was used. Using such warp and weft yarns, a jacket was woven by a shuttle loom with an interwoven selvage of 4 mm and a width of 7.5 cm. The tubular woven fabric was wound using plural rolls which were arranged substantially in-line so that the tubular woven fabric did not bend. The single woven fabric had a warp density of 60 thread/2.54 cm (2,350 dtex) and a weft density of 8 thread/2.54 cm (4,700 dtex). The cover factor was 2,909 in the warp direction and 548 in the weft direction.

The tubular woven fabric was coated by the coating agent in the same manner as in Example 10 with a coated amount of 47 g/m and cut to a length of 2 m. Then, five rectangular holes each having a size of 5 cm×1 cm and a longer side in the widthwise direction of the hose were perforated (see FIG. 5, Shape (d)).

Then, an adhesive (3000 DX SERIES manufactured by Cemedine Co., Ltd.) was applied to an area with a distance of 0.5 cm from the inner edge of each hole and solidified to obtain a hose for distributing inflator gas.

With the produced hose, the total area of the discrete yarn parts, the fraying of the yarns and the weft skew were measured and evaluated. The results are shown in Table 3.

Comparative Example 3

Polyamide 66 fiber having a tenacity of 8.1 cN/dtex was used. As warp yarn, 5×470 dtex (72 filaments) twisted yarn was used, and as weft yarn, 10×470 dtex (72 filaments) twisted yarn was used. Using such warp and weft yarns, a jacket was woven by a shuttle loom with an interwoven selvage of 4 mm and a width of 7.5 cm. The single woven fabric had a warp density of 40 thread/2.54 cm (2,350 dtex) and a weft density of 7 thread/2.54 cm (4,700 dtex). The cover factor was 1,939 in the warp direction and 480 in the weft direction.

The tubular woven fabric was coated by the coating agent, and the holes were formed in the same manner as in Example 10 to obtain a hose for distributing inflator gas. The coated amount was 45 g/m.

With the produced hose, the total area of the discrete yarn parts, the fraying of the yarns and the weft skew were measured and evaluated. The results are shown in Table 3.

TABLE 3

| | | Example No. | | | |
|---|---|---|---|---|---|
| | | 10 | 11 | 12 | Comp. 3 |
| Yarn Material | | Polyamide 66 | | | |
| Yarn fineness | Warp | 2350 | 700 | 2350 | 2350 |
| (dtex) | Weft | 4700 | 2100 | 4700 | 4700 |
| Weaving density | Warp | 74 | 90 | 60 | 40 |
| (thread/2.54 cm) in the direction of | Weft | 10.5 | 14.5 | 8.0 | 7.0 |
| CF in lengthwise direction | | 3587 | 2381 | 2909 | 1939 |
| CF in widthwise direction | | 720 | 664 | 548 | 480 |
| Hose weight prior to coating (g/m) | | 130 | 67 | 103 | 75 |
| Coating agent | | | | | |
| Coated amount (g/m) | | 45 | 30 | 47 | 45 |
| Coating ratio (wt. %) | | 34.6 | 44.8 | 45.6 | 60.0 |
| Additive amount (wt. parts) | | 2 | 2 | 2 | 2 |
| Coated side | | Outer side of hose | | | |
| Shape of hole | | Square | Square (45 degree rotated) | Rectangle | Square |
| Total area of discrete yarn parts (%) | | 3.3 | 3.5 | 13.5 | 31.3 |

TABLE 3-continued

| | Example No. | | | |
|---|---|---|---|---|
| | 10 | 11 | 12 | Comp. 3 |
| Weft skew (%) | 4.8 | 7.1 | 14.0 | 25.0 |
| Fraying of yarns in hole | A | B | C | E |

As can be seen from the results in Table 3, the hoses for introducing and distributing inflator gas according to the present invention, which had the small total area of the discrete yarn parts, suffered from little fraying of the yarns at the inner periphery of the hoses. Thus, with such hoses, it is possible to introduce and distribute the inflator gas in the air bad cushion as originally designed, and the air bag comprising such a hose had high deployment reliability.

The hose of Comparative Example 3 having a large total area of the discrete yarn parts suffered from the large deformation of the holes. Thus, an air bag comprising such a hose did not have good deployment reliability.

Example 13

Polyamide 66 fiber having a tenacity of 8.1 cN/dtex was used. As warp yarn, 5×470 dtex (144 filaments) twisted yarn was used, and as weft yarn, a pair of 5×470 dtex (144 filaments) twisted yarns were used so that 10×470 dtex twisted yarn was apparently present in a hose. Using such warp and weft yarns, a jacket was woven by a needle loom with an interwoven selvage width of 4 mm and a width of 7.5 cm in the weaving pattern of twill. The single woven fabric had a warp density of 74 thread/2.54 cm (2,350 dtex) and a weft density of 10.5 thread/2.54 cm (4,700 dtex). The cover factor was 3,587 in the warp direction and 720 in the weft direction.

The jacket was flattened and dipped in a coating agent (a mixture of silicone rubber ELASTOSIL LR 6200 and ELASTOSIL LR 3003 (weight ratio of 3:1) both manufactured by WACKER) containing an additive (Adhesion Promoter GF86 manufactured by WACKER) and pulled out. The hose was then squeezed with a squeezing plate to remove the excessive coating agent so that the coated amount of the coating agent was made uniform, and then the coating agent was cured at 170° C. for 2 minutes. Thereby, the both outer sides of the flattened hose were coated with the coating agent. The coated amount of the coating agent was 290 g/m², and the corrected weight of the hose after coating was 1,300 g/m².

Then, the hose was cut to a length of 2 m, and one end of the hose was closed by sewing. On the side of the hose having no selvage, five square holes having a side length of 3 cm were perforated at an interval of 30 cm from the open end of the hose. A heating iron was contacted to the inner edges of the holes, that is, the cut surfaces of the warp and weft yarns, to heat them at 450° C. for 8 seconds to melt the yarns together. Each side of the square hole was perpendicular to either the warp direction or the weft direction of the fabric.

With the produced hose, loop hardness Lh, loop repulsion rate Lr, the thickness of a hose wall, the corrected weight of a hose, folding easiness of a hose, fraying of yarns at the inner periphery of a hole, and the bulkiness of a hose were measured and evaluated. The results are shown in Table 4.

Example 14

Polyamide 66 fiber having a tenacity of 8.1 cN/dtex was used. As warp yarn, 5×470 dtex (72 filaments) twisted yarn was used, and as weft yarn, a pair of 5×470 dtex (72 filaments)

twisted yarns were used so that 10×470 dtex twisted yarn was apparently present in a hose. Using such warp and weft yarns, a jacket was woven by a needle loom with an interwoven selvage width of 4 mm and a width of 7.5 cm, in which a part having a width of 2.5 cm from the edge without the selvage was a plain weave, while other part was a twill weave. The single woven fabric had a warp density of 74 thread/2.54 cm (2,350 dtex) and a weft density of 10.5 thread/2.54 cm (4,700 dtex). The cover factor was 3,587 in the warp direction and 720 in the weft direction.

The tubular woven fabric was coated by the coating agent in the same manner as in Example 13 with a coated amount of 290 g/m², and the corrected weight of the hose was 1,300 g/m². The hose was cut to a length of 2 m. Then, the holes were perforated in the same manner as in Example 13.

The properties of the produced hose were measured and evaluated as in Example 13. The results are shown in Table 4.

Comparative Example 4

Polyamide 66 fiber having a tenacity of 8.1 cN/dtex was used. As warp yarn, 5×470 dtex (72 filaments) twisted yarn was used, and as weft yarn, a pair of 5×470 dtex (72 filaments) twisted yarns were used so that 10×470 dtex twisted yarn was apparently present in a hose. Using such warp and weft yarns, a jacket of a plain weave was woven by a needle loom with an interwoven selvage width of 4 mm and a width of 7.5 cm. The single woven fabric had a warp density of 74 thread/2.54 cm (2,350 dtex) and a weft density of 10.5 thread/2.54 cm (4,700 dtex). The cover factor was 3,587 in the warp direction and 720 in the weft direction.

The tubular woven fabric was coated by the coating agent in the same manner as in Example 13 with a coated amount of 280 g/m², and the corrected weight of the hose was 1,290 g/m². The hose was cut to a length of 2 m. Then, the holes were perforated in the same manner as in Example 13.

The properties of the produced hose were measured and evaluated as in Example 13. The results are shown in Table 4.

Comparative Example 5

Polyamide 66 fiber having a tenacity of 8.1 cN/dtex was used. As warp yarn, 2×350 dtex (108 filaments) twisted yarn was used, and as weft yarn, 6×350 dtex (108 filaments) twisted yarn was used. Using such warp and weft yarns, a jacket of a plain weave was woven by a shuttle loom with a width of 7.3 cm. The single woven fabric had a warp density of 90 thread/2.54 cm (700 dtex) and a weft density of 14.5 thread/2.54 cm (2,100 dtex). The cover factor was 2,381 in the warp direction and 664 in the weft direction.

The tubular woven fabric was coated by the coating agent in the same manner as in Example 13 with a coated amount of 211 g/m², and the corrected weight of the hose was 631 g/m². The hose was cut to a length of 2 m. Then, the holes were perforated in the same manner as in Example 13.

The properties of the produced hose were measured and evaluated as in Example 13. The results are shown in Table 4.

Comparative Example 6

Polyamide 66 fiber having a tenacity of 8.1 cN/dtex was used. As warp yarn, 10×470 dtex (72 filaments) twisted yarn was used, and as weft yarn, 20×470 dtex (72 filaments) twisted yarn was used. Using such warp and weft yarns, a jacket of a plain weave was woven by a shuttle loom with a width of 7.5 cm. The single woven fabric had a warp density of 74 thread/2.54 cm (4,700 dtex) and a weft density of 6.5 thread/2.54 cm (9,400 dtex). The cover factor was 5,073 in the warp direction and 630 in the weft direction.

The tubular woven fabric was coated by the coating agent in the same manner as in Example 13 with a coated amount of 180 g/m, and the corrected weight of the hose was 2,040 g/m². The hose was cut to a length of 2 m. Then, the holes were perforated in the same manner as in Example 13.

The properties of the produced hose were measured and evaluated as in Example 13. The results are shown in Table 4.

TABLE 4

| | | Example No. | | | | |
|---|---|---|---|---|---|---|
| | | 13 | 14 | Comp. 4 | Comp. 5 | Comp. 6 |
| Yarn material | | Polyamide 66 | | | | |
| Yarn fineness | Warp | 2350 | 2350 | 2350 | 700 | 4700 |
| (dtex) | Weft | 4700 | 4700 | 4700 | 2100 | 9400 |
| Weaving density | Warp | 74 | 74 | 74 | 90 | 74 |
| (thread/2.54 cm) | Weft | 10.5 | 10.5 | 10.5 | 14.5 | 6.5 |
| Weave     near hole | | Twill | Plain | Plain | Plain | Plain |
| structure other | | Twill | Twill | Plain | Plain | Twill |
| CF in lengthwise direction | | 3587 | 3587 | 3587 | 2381 | 5073 |
| CF in widthwise direction | | 720 | 720 | 720 | 664 | 630 |
| Hose weight prior to coating (g/m²) | | 1010 | 1010 | 1010 | 420 | 1860 |
| Coating agent | | | | | | |
| Coated amount (g/m²) | | 290 | 290 | 280 | 211 | 180 |
| Coating ratio (wt. %) | | 28.7 | 28.7 | 27.7 | 50.2 | 9.7 |
| Additive amount (wt. parts) | | 2 | 2 | 2 | 2 | 2 |
| Corrected weight (g/m²) | | 1300 | 1300 | 1290 | 631 | 2040 |
| Loop hardness Lh (N) | | 4.9 | 5.5 | 8.5 | 1.3 | 15.2 |
| Thickness t of hose wall (mm) | | 1.4 | 1.4 | 1.4 | 0.7 | 3.2 |
| Lh/t (N/t) | | 3.5 | 3.9 | 6.1 | 1.8 | 4.8 |
| Loop repulsion rate (%) | | 35.0 | 38.0 | 38.5 | 36.9 | 28.1 |
| Bending easiness of hose | | A | A | C | A | C |
| Fraying of yarns in hole | | B | A | A | D | D |
| Bulkiness of a hose (mm) | | 35 | 38 | 50 | 25 | 55 |

As can be seen from the results of Table 4, the hoses of Examples 13 and 14 had suitable hardness in relation to the thickness of the hose wall, and adequate repulsion, they had good receivability. Furthermore, they were not damaged when the high pressure gas flowed through them and had high strength.

The hose of Comparative Example 4 had high strength sufficient for withstanding the flow of high pressure gas. However, it had excessively large hardness in relation to the thickness, that is, large Lh/t, it has inferior receivability and less workability. The hose of Comparative Example 5 used the thin fabric, and it might be expected that it could be easily folded and had good receivability. However, the corrected weight of the hose was small and thus it had insufficient strength required when the high pressure gas was flowed therethrough. The hose of Comparative Example 6 used the fabric having too large thickness so that it could not be easily folded. In addition, the hose was bulky and thus inferior receivability.

In the hose for introducing and distributing inflator gas according to the first invention, the strength of the peripheral part of the hole is sufficiently increased. Thus, the damage of the peripheral part of the hole can be effectively prevented when the air bag is deployed, and the reliability of the hose is improved.

Since the hose of the second invention has sufficiently improved stiffness in the lengthwise direction, it does not bounce when high pressure gas flows through the hose to deploy an air bag, and thus the deployment reliability of the air bag can be improved.

In the hose of the third invention, the ratio of the total area $S_1$ of discrete yarn parts to the area of the hole is limited in a specific range. Therefore, the enlargement and/or deformation of the hole can be prevented so that the deployment reliability of the air bag can be improved.

The hose of the fourth invention has sufficiently high strength such that the hose is not damaged when a high pressure gas is introduced in the hose and also adequate flexibility. Therefore, an air bag receiving such a hose can be easily folded, and the size of the folded air bag can be reduced.

Furthermore, since the hose of the present invention is made of fabric, it has light weight and good receivability. In addition, such a hose is advantageous from the viewpoint of costs.

What is claimed is:

1. A hose comprising a woven fabric and having at least one distribution hole for introduction and distribution of inflator gas on actuation of an air bag, which hose is installed in a side curtain air bag module,
   wherein the outer surface of said hose is coated with a rubber or a synthetic resin, and the maximum drawing resistance of fiber is at least 70 N/3 cm in a warp direction and a weft direction, when the drawing resistance is measured by a pin-hitching method defined in JIS L1096, 8.21.3 with a sample having a width of 3 cm and a length of 5 cm which is cut out from the hose such that the periphery of the hole constitutes one side of the sample and the width direction of the sample is perpendicular to each of the warp and weft directions of the fabric of the hose,
   wherein said fabric has a cover factor (CF) that is defined by the following formula, of from 2,200 to 5,000 in the lengthwise direction and from 600 to 900 in the widthwise direction of said hose: CF=[total fineness (dtex) of a yarn in lengthwise or widthwise direction of a hose]$^{1/2}$×[weave density in lengthwise or widthwise direction of a hose (threads/2.54 cm)], and
   wherein a coated amount of said rubber or said synthetic resin is 25 to 60% by weight of the weight of the hose before coating.

2. The hose according to claim 1, wherein said maximum drawing resistance is at least 100 N/3 cm in a warp direction and a weft direction.

3. The hose according to claim 1, wherein said hose has a reinforced part at the inner periphery of the hole.

4. The hose according to claim 1, wherein said reinforced part is formed by applying an adhesive to the inner periphery of the hole.

5. The hose according to claim 1, wherein said reinforced part is formed at the same time as the formation of the hole by cuffing the hose wall with laser beam.

6. The hose according to claim 1, wherein said reinforced part is formed by contacting a heating means to the inner periphery of the hole.

7. The hose according to claim 1, wherein said yarn in the lengthwise direction of the hose has a total fineness of 500 to 3,000 dtex, and the yarn in the widthwise direction of the hose has a total fineness of 500 to 5,000 dtex.

8. A hose comprising a woven fabric for introduction and distribution of inflator gas on actuation of an air bag, which hose is installed in a side air bag module,
   wherein the outer surface of said hose is coated with a rubber or a synthetic resin, and the fabric has a bending resistance of at least 100 mm in a direction in parallel with the lengthwise direction of the hose,
   wherein said fabric has a cover factor (CF) that is defined by the following formula, of from 2,200 to 5,000 in the lengthwise direction and from 600 to 900 in the widthwise direction of said hose CF=[total fineness (dtex) of a yarn in lengthwise or widthwise direction of a hose]$^{1/2}$×[weave density in lengthwise or widthwise direction of a hose (threads/2.54 cm)], and
   wherein a coated amount of said rubber or said synthetic resin is 25 to 60% by weight of the weight of the hose before coating.

9. The hose according to claim 8, wherein the lengthwise direction of said hose is in accordance with either a warp direction or a weft direction of said woven fabric.

10. The hose according to claim 8 or 9, wherein an original yarn in the lengthwise direction of said hose has a single filament fineness of at least 2 dtex when the fabric is unwoven.

11. The hose according to claim 8, wherein said yarn in the lengthwise direction of the hose has a total fineness of 500 to 3,000 dtex, and the yarn in the widthwise direction of the hose has a total fineness of 500 to 5,000 dtex.

12. A hose comprising a woven fabric and having at least one distribution hole for introduction and distribution of inflator gas on actuation of an air bag, which hose is installed in a side air bag module, said distribution hole having an area $S_0$,
   wherein said hole is formed by perforating the fabric of the hose, and an area $S_1$ of discrete yarn parts is 30% or less of the area $S_0$ of the hole when the hose area having said hole is flattened,
   wherein said fabric has a cover factor (CF) that is defined by the following formula, of from 2,200 to 5,000 in the lengthwise direction and from 600 to 900 in the widthwise direction of said hose CF=[total fineness (dtex) of a yarn in lengthwise or widthwise direction of a hose]$^{1/2}$×[weave density in lengthwise or widthwise direction of a hose (threads/2.54 cm)],
   wherein said hose has a weft skew of 20% or less in the widthwise direction of said hose when measured according to JIS L1096, 8.11, and
   wherein the outer surface of said hose is coated with a rubber or a synthetic resin, and a coated amount of said rubber or said synthetic resin is 25 to 60% by weight of the weight of the hose before coating.

13. The hose according to claim 12, wherein at least one of the outer surface and the inner surface of said hose is coated with a rubber or a synthetic resin.

14. The hose according to claim 12, wherein said yarn in the lengthwise direction of the hose has a total fineness of 500 to 3,000 dtex, and the yarn in the widthwise direction of the hose has a total fineness of 500 to 5,000 dtex.

15. The hose according to claim 12, wherein said hole is in a square form the sides of which are substantially in parallel with the lengthwise and widthwise directions of the hose, or in a square form the diagonals of which are substantially in parallel with the lengthwise and widthwise directions of the hose.

* * * * *